United States Patent
Fei et al.

(10) Patent No.: US 10,853,080 B2
(45) Date of Patent: Dec. 1, 2020

(54) SYSTEM AND METHOD OF MERGING PARTIAL WRITE RESULTS FOR RESOLVING RENAMING SIZE ISSUES

(71) Applicant: Shanghai Zhaoxin Semiconductor Co., Ltd., Shanghai (CN)

(72) Inventors: Xiaolong Fei, Beijing (CN); Mengchen Yang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 102 days.

(21) Appl. No.: 15/810,876

(22) Filed: Nov. 13, 2017

(65) Prior Publication Data

US 2018/0373539 A1     Dec. 27, 2018

(30) Foreign Application Priority Data

Jun. 23, 2017    (CN) .......................... 2017 1 0491888

(51) Int. Cl.
*G06F 9/38* (2018.01)
*G06F 9/30* (2018.01)

(52) U.S. Cl.
CPC ............ *G06F 9/384* (2013.01); *G06F 9/3017* (2013.01); *G06F 9/30112* (2013.01); *G06F 9/30123* (2013.01); *G06F 9/30181* (2013.01); *G06F 9/3836* (2013.01)

(58) Field of Classification Search
CPC ...................................................... G06F 9/384
See application file for complete search history.

(56) References Cited

U.S. PATENT DOCUMENTS

| | | | | |
|---|---|---|---|---|
| 6,463,525 | B1* | 10/2002 | Prabhu ................ | G06F 9/30014 708/513 |
| 2002/0129224 | A1* | 9/2002 | Leber .................. | G06F 9/30032 712/209 |
| 2004/0059890 | A1* | 3/2004 | Francis ................ | G06F 9/3816 712/204 |
| 2009/0254735 | A1* | 10/2009 | Col ....................... | G06F 9/3836 712/208 |
| 2011/0035745 | A1* | 2/2011 | Li ........................ | G06F 9/30174 718/1 |
| 2012/0059866 | A1* | 3/2012 | Conyngham ......... | G06F 7/4873 708/503 |

(Continued)

FOREIGN PATENT DOCUMENTS

| | | |
|---|---|---|
| CN | 104049947 A | 9/2014 |
| CN | 106095393 A | 11/2016 |

*Primary Examiner* — Michael J Metzger
(74) *Attorney, Agent, or Firm* — McClure, Qualey & Rodack, LLP

(57) ABSTRACT

A processor including a physical register file with multiple physical registers, mapping logic, and a merge system. The mapping logic maps up to a first maximum number of the physical registers for each architectural register specified in received program instructions and stores corresponding mappings in a rename table. The merge system generates a merge instruction for each architectural register that needs to be merged, inserts each generated merge instruction into the program instructions to provide a modified set of instructions, and that issues the modified set of instructions in consecutive issue cycles based on a take rule. In one embodiment, the first maximum number may be two.

20 Claims, 4 Drawing Sheets

(56) References Cited

U.S. PATENT DOCUMENTS

| | | | |
|---|---|---|---|
| 2013/0297919 A1* | 11/2013 | Kang | G06F 9/38 |
| | | | 712/241 |
| 2014/0019728 A1* | 1/2014 | Reid | G06F 9/30036 |
| | | | 712/222 |
| 2014/0281415 A1 | 9/2014 | Burgess et al. | |
| 2015/0121040 A1* | 4/2015 | Weidner | G06F 9/384 |
| | | | 712/217 |
| 2015/0121047 A1* | 4/2015 | Bradbury | G06F 9/30098 |
| | | | 712/226 |
| 2015/0261534 A1* | 9/2015 | Uliel | G06F 9/30036 |
| | | | 712/208 |
| 2017/0371667 A1 | 12/2017 | Fei | |

* cited by examiner

| ARCH | SPECULATIVE INFO ||||||
|---|---|---|---|---|---|---|
| | VALID 1 | P_IDX 1 | SIZE 1 | VALID 2 | P_IDX 2 | SIZE 2 |
| RBX | 1 | PR6 | 64 | 0 | - | - |
| RCX | 1 | PR7 | 32 | 0 | - | - |
| RAX | 1 | PR1 | 64 | 1 | PR2 | 32 |
| RSP | - | - | - | - | - | - |
| ⋮ | ⋮ | ⋮ | ⋮ | ⋮ | ⋮ | ⋮ |

*FIG. 2*

| ARCH | SPECULATIVE INFO ||||||
|---|---|---|---|---|---|---|
| | VALID 1 | P_IDX 1 | SIZE 1 | VALID 2 | P_IDX 2 | SIZE 2 |
| RBX | 1 | PR6 | 64 | 0 | - | - |
| RCX | 1 | PR7 | 32 | 0 | - | - |
| RAX | 1 | PR1 | 64 | 0 | - | - |
| RSP | 1 | PR3 | 64 | 0 | - | - |
| ⋮ | ⋮ | ⋮ | ⋮ | ⋮ | ⋮ | ⋮ |

*FIG. 3*

| ARCH | SPECULATIVE INFO ||||||
|---|---|---|---|---|---|---|
| | VALID 1 | P_IDX 1 | SIZE 1 | VALID 2 | P_IDX 2 | SIZE 2 |
| RBX | 1 | PR6 | 64 | 0 | - | - |
| RCX | 1 | PR7 | 32 | 0 | - | - |
| RAX | 1 | PR1 | 64 | 1 | PR3 | 16 |
| RSP | - | - | - | - | - | - |
| ⋮ | ⋮ | ⋮ | ⋮ | ⋮ | ⋮ | ⋮ |

SYSTEM AND METHOD OF MERGING PARTIAL WRITE RESULTS FOR RESOLVING RENAMING SIZE ISSUES

CROSS REFERENCE TO RELATED APPLICATIONS

This application claims the benefit of China Patent Application No. 201710491888.7, filed on Jun. 23, 2017, the entirety of which is incorporated by reference herein.

BACKGROUND OF THE INVENTION

Field of the Invention

The present invention relates in general to register renaming to resolve stored result size issues in a processor, and more particularly to a system and method of inserting merge instructions to merge partial write results.

Description of the Related Art

A processor incorporates a set of registers to store the results of write operations. Write operations are performed by a subset of the standard instruction set architecture (ISA) of the processor, such as the x86 architecture or the like by Intel®. In many architectures, including the x86 architecture, instructions that perform a write operation may refer to at least one of a set of predefined architectural registers for storing the results. More recent processor configurations implement a physical register file (PRF) renaming style that makes the processor design more concise and enables more convenient design expansion. A processor with PRF renaming incorporates a physical register file (PRF) for storing operation results and a renaming structure for mapping architectural registers to physical registers. The PRF is a set of physical registers, each being identified using a unique one of a set of indexes or pointers or the like. The renaming structure maps an architectural register referenced by an instruction to an index of at least one corresponding physical register.

During execution of a software program or application, when an instruction is encountered that references an architectural register for storing the results of the instruction, the processor allocates an available physical register from among a "freelist" of physical register indexes, attaches or otherwise assigns the selected index to the instruction, and updates a speculative portion of the renaming structure to map the architectural register to the selected physical register. When the instruction is executed, the index is used to access the physical register to store the results. When the instruction is retired, the index may be moved to a retire portion of the renaming structure (or else to a different renaming structure) to map the physical register to the specified architectural register. The physical to architectural register mapping may be used by subsequent read operations until overwritten or redefined. A separate set of physical architectural registers are not needed; instead, architectural identifiers or the like are simply mapped to physical register indices. The PRF renaming style is more efficient since the indexes are simply moved or remapped rather than having to move values between registers.

A sizing issue arises when the architecture uses complex operand sizes which allows partial write operations to modify only a portion of the entire register. The x86 architecture, for example, uses such complex operand sizes although the present invention is not limited to the x86 architecture. As an example of complex operand sizes, write instructions may be executed to modify 8 bits, 16 bits, 32 bits or 64 bits of a 64-bit register, in which each larger size incorporates the smaller write sizes (since referenced to a common end of the register). Each instruction may be assigned a separate physical register even if referencing the same architectural register. A subsequent write operation that is the same size or larger than a prior write operation to the same architectural register is properly handled in the system without further modification. A subsequent write operation that is smaller than a prior write operation to the same architectural register, however, causes a problem for a following larger read operation referencing the same architectural register since no single physical register holds the complete result of that architectural register.

SUMMARY OF THE INVENTION

A processor according to one embodiment includes a physical register file with multiple physical registers, mapping logic, and a merge system. The mapping logic maps up to a first maximum number of the physical registers for each architectural register specified in received program instructions and stores corresponding mappings in a rename table. The merge system generates a merge instruction for each architectural register that needs to be merged, inserts each merge instruction into the program instructions to provide a modified set of instructions, and that issues the modified set of instructions in consecutive issue cycles based on a take rule. In one embodiment, the first maximum number may be two.

The merge system may include a merge detector, a merge instruction generator, merge take logic, and instruction issue logic. The merge detector detects whether a read instruction of reads an architectural register mapped to multiple physical registers, detects whether a write instruction of would cause a mapping to exceed the first maximum number, and generates a merge identifier identifying merging of any of the architectural registers. The merge instruction generator generates the merge instruction for each architectural register to be merged based on the merge identifier. The merge take logic determines which merge instructions should be inserted before any of the program instructions based on the take rule and generates a kill indication indicating which instructions are to be issued per clock cycle. The instruction issue logic provides an issue instruction control based on the kill indication.

The instruction issue logic may include an instruction reorder module that receives the kill indication, the program instructions, and any merge instructions generated by the merge instruction generator, and provides the issue instruction control to control instructions to be issued in each clock cycle.

The instruction issue logic may include an instruction shifter and an instruction reorder module. The instruction shifter shifts the program instructions according to the kill instruction. The instruction reorder module receives the program instructions and any merge instructions generated by the merge instruction generator and provides the issue instruction control to control instructions to be issued in each clock cycle.

A method of merging partial write results for resolving renaming size issues for a processor according to one embodiment includes mapping each of multiple architectural registers specified in received program instructions in a rename table with up to a first maximum number of physical registers for each architectural register, detecting when any of the architectural registers needs to be merged before execution of at least one of the program instructions, generating a merge instruction for each architectural register that needs to be merged, inserting each merge instruction into the program instructions to provide a modified set of instructions, and issuing the modified set of instructions in consecutive clock cycles based on a take rule that establishes a corresponding timing and performance trade-off. The first maximum number may be two.

The method may include detecting whether a read instruction reads an architectural register mapped to multiple physical registers, and generating a corresponding read merge instruction. The method may include detecting whether a write instruction of would cause a mapping to exceed the first maximum number, and generating a corresponding write merge instruction.

The method may include generating a merge identifier that identifies any of the architectural registers that needs to be merged based on the detecting, and using the merge identifier during the generating and issuing.

The method may include determining which of any generated merge instruction should be inserted before any of the program instructions based on the take rule, generating a kill indication indicating which instructions are to be issued per clock cycle, and providing an issue instruction control based on the kill indication.

The method may include selecting a take rule from among multiple take rules in which each take rule provides a different trade-off between timing and performance.

BRIEF DESCRIPTION OF THE DRAWINGS

The benefits, features, and advantages of the present invention will become better understood with regard to the following description, and accompanying drawings where:

FIG. 2 is a diagram of at least a portion of the rename table of FIG. 1 according to one embodiment of the present invention after execution of instructions μop1 and μop2 and prior to execution of μop3;

FIG. 3 is a diagram of at least a portion of the rename table of FIG. 1 according to one embodiment of the present invention after execution of the instructions μop1, μop2, μopM and μop3;

FIG. 4 is a diagram of at least a portion of the rename table of FIG. 1 according to one embodiment of the present invention in which only 2 mappings per architectural register are included, and where the merge instruction μopM is inserted prior to the second partial write instruction in the same manner previously described to combine the contents of registers PR1 and PR2 into PR1 in the same manner as shown by entry 206 in FIG. 3;

DETAILED DESCRIPTION

The inventors have recognized sizing issues of the PRF renaming style caused by an instruction set architecture that use complex operand sizes. They have therefore developed a system and method of inserting merge instructions to merge partial write results to keep partial write results to a predetermined maximum and to enable subsequent read operations.

Figure 1:
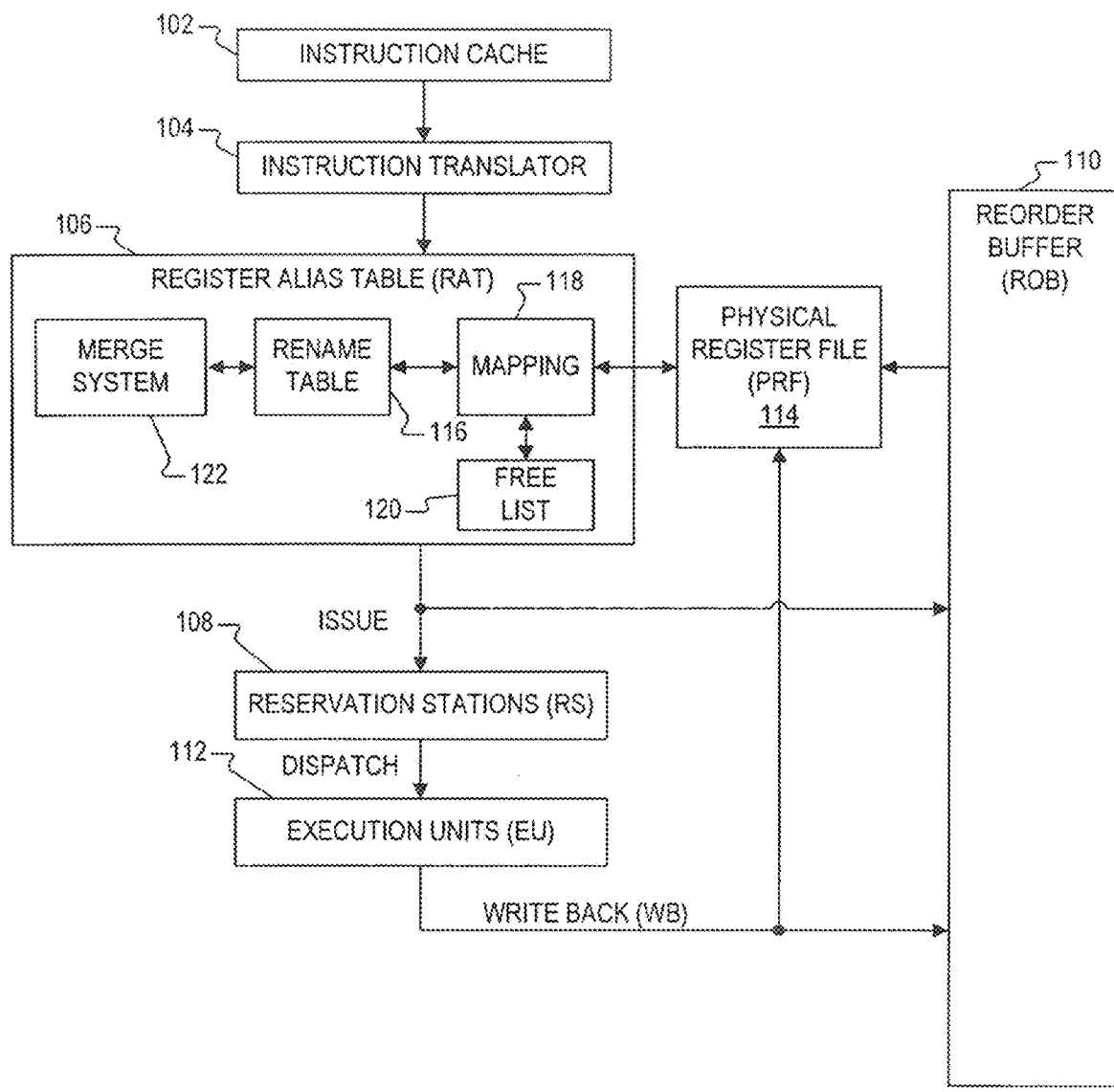
FIG. 1 is a simplified block diagram of a superscalar, pipelined processor implemented according to one embodiment of the present invention.

FIG. 1 is a simplified block diagram of a superscalar, pipelined processor 100 implemented according to one embodiment of the present invention. The term "processor" as used herein refers to any type of processing unit, including a microprocessor, a central processing unit (CPU), a processing core, a microcontroller, etc. The term "processor" as used herein also includes any type of processor configuration, such as one or more processing units integrated on a chip or integrated circuit (IC) including those incorporated within a system on a chip (SOC) or the like. The processor 100 includes an instruction cache 102 that caches macroinstructions of an instruction set architecture (ISA), such as the x86 instruction set architecture or the like. Additional or alternative instruction set architectures are contemplated that allow complex operand sizes. The processor 100 includes an instruction translator 104 that receives and translates the macroinstructions into microinstructions. The microinstructions may typically be referred to as microinstructions, but are more generally referred to herein simply as "instructions" or even more simply as "μops." The microinstructions are then provided in program order to a register alias table (RAT) 106, which generates microinstruction dependencies and issues the microinstructions in program order to reservations station (RS) 108 and to a reorder buffer (ROB) 110. The ROB 110 stores an entry for every instruction issued from the RAT 106 and ensures in-order retirement of the issued instructions.

The RS 108, otherwise referred to as a dispatcher, dispatches the instructions to an appropriate one of multiple execution units 112. In one embodiment, the processor 100 is an out-of-order (OOO) processor in which the RS 108 may dispatch instructions to the execution units 112 when ready to be executed rather than strictly in program order. An instruction is considered ready for execution when all of its dependencies are resolved and an appropriate execution unit 112 is available to execute the instruction. The RAT 106 determines and forwards dependency information to the RS 108 for the issued instructions, and the RS 108 uses the dependency information for determining when to dispatch the instructions for execution. Although not specifically shown, the execution units 112 may include one or more integer execution units, such as an integer arithmetic/logic unit (ALU) or the like, one or more floating point execution units, such as including a single-instruction-multiple-data (SIMD) execution unit such as MMX and SSE units or the like, a memory order buffer (MOB), etc. Any result of a write instruction is written to a physical register within a physical register file (PRF) 114 via a write back (WB) path. The entry of the ROB 110 corresponding to the write instruction stores an index to the physical register for writing the results.

The RAT 106 includes a rename table 116, mapping logic 118, a free list 120, and a merge system 122. The rename table 116 cross-references or maps architectural registers to the physical registers of the PRF 114. The free list 120 stores a list of indexes to corresponding physical registers that are not allocated. When a write operation references an architectural register for storing results, the mapping logic 118 consults the rename table 116 to determine whether the architectural register is already mapped. If not already mapped, then the mapping logic 118 consults the free list 120 and selects and allocates a physical register. The mapping logic 118 then stores the index of the allocated physical register into an entry of the rename table 116 corresponding to the architectural register referenced in the write instruction. In this manner, the physical register is initially mapped to both the architectural register and the write instruction. As further described herein, each architectural register may be mapped to multiple physical registers in response to one or more partial write instructions, in which the complete contents of the architectural register is distributed among multiple physical registers and thus is not stored in any one physical register. The rename table 116 may be configured to map up to a predetermined number "N" of physical registers, in which a merge operation is performed to maintain the total mapping number at or below N as further described herein.

The merge system 122 analyzes the sources and/or destination of the μops provided from the instruction translator 104 to determine whether partial results stored in multiple physical registers mapped to an indicated architectural register needs to be merged to a single physical register. For each architectural register that needs to be merged, the merge system 122 generates and inserts a merge instruction into the instruction stream. The merge system 122 determines where each merge instruction is to be inserted and further determines the μops to be issued to the RS 108 in each cycle according to applicable take rules as further described herein. The RAT 106 then issues the μops to the RS 108 as indicated by the ordering and numbering established by the merge system 122 as further described herein.

The ISA for the processor 100, such as x86 in the illustrated configuration, uses complex operand sizes allowing partial writes to each architectural register. The x86 architecture includes several architectural registers that may be accessed with multiple sizes. The 64-bit versions include register notations RAX, RBX, RCX, RDX, etc., (64-bit uses pre-pended 'R' notations) in which a write operation using any of these 64-bit notations is a write to the entire register. These registers include 32-bit notations EAX, EBX, ECX, EDX, etc., respectively, (32-bit uses pre-pended 'E' notations) as well as 16-bit notations AX, BX, CX, DX, etc., respectively (16-bit uses only register name without a pre-pended letter). 8-bit notations may also be defined, but each is typically to the most significant byte (MSB) or the least significant byte (LSB) of the 16-bit version and are not further described. The architectural identifiers in the rename table 116 need only include a single reference for any given register or portions thereof.

When a series of μop instructions employ complex operand sizes in which multiple physical registers store portions of the same architectural register, a challenge is presented when attempting to read the architectural register. As an example, consider the following instruction pattern:

| μop1) | MOV RAX, RBX |
| μop2) | MOV EAX, ECX |
| μop3) | MOV RSP, RAX |

A first physical register is allocated for the first MOV instruction (μop1) and the allocated physical register is mapped to the RAX architectural register. The first MOV instruction μop1 instructs the processor 100 to move the contents of the 64-bit register RBX into the 64-bit register RAX. In operation, the contents of a physical register allocated to RBX is moved to the physical register allocated for RAX. A second physical register is allocated for the second MOV instruction (μop2) and mapped to the EAX architectural register. The second MOV instruction μop2 instructs the processor 100 to move the contents of the 32-bit register ECX into the 32-bit register EAX. In operation, the contents are moved from one physical register to another according to the mapping. It is noted, however, that architectural register EAX is the least significant portion (lower half) of the RAX architectural register, so that effectively the contents of the RAX register are intended to be modified by μop2. Thus, neither of the first and second physical registers holds the complete contents of the RAX architectural register; instead, a portion is stored in each. A third physical register is allocated for the third MOV instruction (μop3) and mapped to the RSP architectural register (e.g., stack pointer register). The third MOV instruction is intended to move the contents of RAX into RSP. The contents of RAX, however, are distributed between two different physical registers, so that μop3 cannot fetch the complete contents of RAX from a single physical register.

FIG. 2 is a diagram of at least a portion of the rename table 116 according to one embodiment of the present invention after execution of the instructions μop1 and μop2 listed above, but prior to execution of μop3. A first, left-most column of the rename table 116 lists architectural (ARCH) register notations for the 64 bit versions, shown as RAX, RBX, RCX, RSP, etc. Although only the 64 bit version are illustrated, it is appreciated that the ARCH notation may also include 32 bit versions, 16 bit versions, 8 bit versions, etc. The next series of columns denote speculative information for mapping up to a predetermined maximum number N of physical registers for each architectural register listed. Although it is possible in various embodiments to map additional physical registers to each architectural register, merging 3 or more physical registers becomes computationally complex (e.g., N is 3 or more). In one embodiment, a partial write to a third physical register is merged so that only 2 mappings are allowed at a time in the rename table 116 (e.g., N=2). The speculative information includes a valid value (VALID 1), a physical index notation (P_IDX 1), and a size value (SIZE 1) for a first mapped physical register, and a valid value (VALID 2), a physical index notation (P_IDX 2), and a size value (SIZE 2) for a second mapped physical register. The valid value is "1" if the mapping is valid, but is otherwise "0." The physical register index notation has the form PRX in which "X" is a number from 1 to the total number of available physical registers. The size value is indicated as the number of bits of the valid value stored by the register. A dash notation "-" for any entry indicates a "don't care" or a non-entry.

As shown, a first entry 202 maps 64 bits of a physical register identified by index PR6 to RBX, and a second entry 204 maps 32 bits of a physical register identified by index PR7 to RCX (or ECX). It is presumed that previously executed instructions stored the corresponding results into the physical registers PR6 and PR7 for the architectural registers RBX and RCX. A third entry 206 maps 64 bits of a first physical register identified by index PR1 to the register RAX after μop1 is executed, in which the contents of PR6 are moved to PR1. The third entry 206 also maps 32 bits of a second physical register identified by index PR2 to RAX after μop2 is executed, in which the contents of PR7 are moved to PR2. It is appreciated, therefore, that the value of the 64-bit architectural register RAX is contained within the two physical registers PR1 and PR2, in which the lower or least significant 32 bits are stored in PR2 and the next more significant 32 bits are stored in PR1. The third MOV instruction is intended to move the contents of RAX into RSP. The contents of RAX, however, are distributed between two different physical registers, PR1 and PR2, so that μop3 cannot fetch the complete contents of RAX from a single physical register.

The merge system 122 examines the instruction stream including μop1-μop3 and detects the size issue in which the contents of RAX are stored in two different physical registers. The merge system 122 generates a merge (MRG) instruction that merges the contents of PR2 into the PR1 so that PR1 stores the full contents of RAX. The MRG instruction is inserted to modify the original instruction pattern as follows:

| μop1) | MOV RAX, RBX |
| μop2) | MOV EAX, ECX |
| μopM) | MRG PR1, PR2, PR1 |
| μop3) | MOV RSP, RAX | in which μopM is inserted before μop3 and operates to combine the contents of PR2 into PR1. The format of the merge (MRG) instruction μopM includes 3 arguments or operands, including 2 source registers and 1 destination register. The first two operands PR1 and PR2 are the source operands in which the first, PR1, identifies the source of the larger result, and the second, PR2, identifies the source of the smaller result. The third operand PR1 identifies the destination of the merge operation, in which the smaller result stored in PR2 is merged with the larger result stored in PR1 and the merged result is stored back into PR1 as the destination register. After execution of μopM, μop3 may be executed without modification since the physical register PR1 stores the complete contents of the architectural register RAX.

FIG. 3 is a diagram of at least a portion of the rename table 116 according to one embodiment of the present invention after execution of the instructions μop1, μop2, μopM and μop3. After execution of μopM, entry 206 of the rename table is modified in which VALID 2 is changed to "0" to denote that RAX is mapped only to one physical register PR1. Upon execution of μop3, another physical register PR3 is assigned to architectural register RSP and the contents of PR1 are copied into PR3 as shown by a fourth entry 208, in which the values VALID 1, P_IDX 1 and SIZE 1 of entry 208 are 1, PR3 and 64, respectively. Also, the VALID 2 value may be set to "0" so that it is clear that RSP is mapped to only one physical register PR3. Although the instructions μop1, μop2, and μop3 are "move" instructions, they may be implemented as "copy" operations in which the contents of RBX, RCX and RAX remain valid as indicated in the rename table 116 after execution of the four instructions.

The above example illustrates insertion of a merge instruction prior to a read instruction that attempts to read an architectural register distributed among multiple (e.g., 2) physical registers. The merge instruction merges the contents of the multiple physical registers into one register to enable successful operation of the read instruction. Consider instead the situation in which μop3 is another partial write operation, such as MOV AX, DX, in which a second partial write is made to the lower 16 bits of the architectural register RAX. In one embodiment (not shown), the rename table 116 may include a third set of valid, index, and size entries to store a third partial write result for RAX. A third physical register, say PR3, could be used to store the lower 16 bits results of the second partial write to RAX. Mapping 3 or more physical registers to one architectural register may be computationally complex in certain configurations. As shown in FIG. 4 for the illustrated embodiment in which only 2 mappings per architectural register are included (e.g. N=2), the merge instruction μopM is inserted prior to the second partial write instruction in the same manner previously described to combine the contents of registers PR1 and PR2 into PR1 in the same manner as shown by entry 206 in FIG. 3. Then, for entry 206, the VALID 2 value is changed to "1," the P_IDX 2 value is changed to PR3, and the SIZE 2 is changed to 16 so that RAX is still mapped to only 2 physical registers, namely, PR1 and PR3.

In summary, the merge system 122 generates merge instructions to perform either a read merge when an instruction attempts to read from an architectural register mapped to multiple physical registers, or a write merge when an instruction attempts to perform an additional partial write to an architectural register that is already mapped to the maximum number of physical register. The write merge is used to prevent mapping more than the maximum number of physical registers to the same architectural register (and portions thereof), and the read merge is used to merge the contents of multiple physical registers to one physical register to enable proper operation for a subsequent read instruction.

Figure 5:
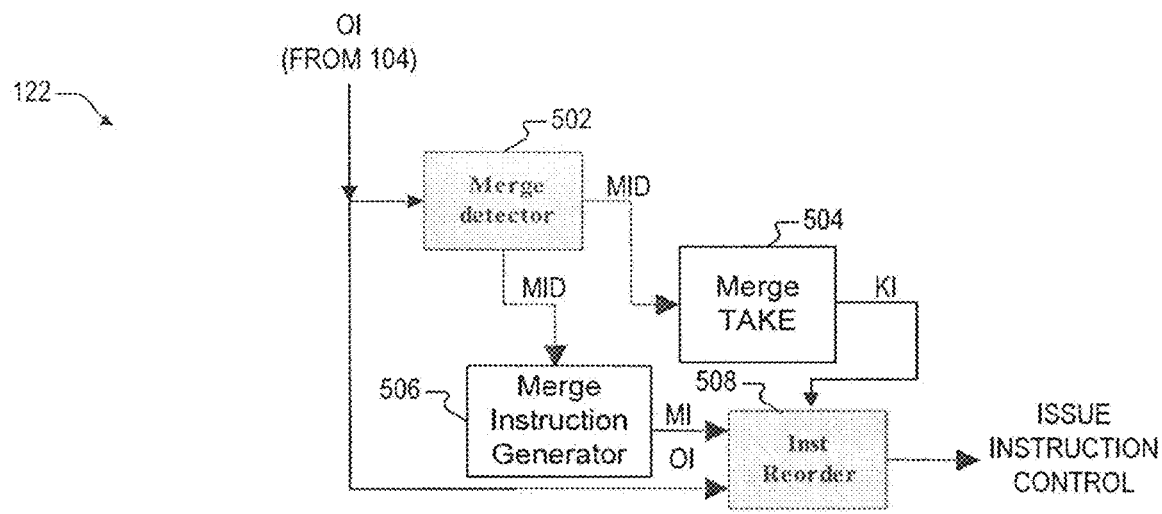
FIG. 5 is a block diagram illustrating the merge system of FIG. 1 implemented according to one embodiment of the present invention.

FIG. 5 is a block diagram illustrating the merge system 122 implemented according to one embodiment of the present invention. The original instructions (OI) provided by the instruction translator 104 to the RAT 106 are provided to a merge detector 502 and to an instruction reorder module 508. In one embodiment, the instruction translator 104 provides up to four μops at a time per clock cycle. The merge detector 502 analyzes the architectural registers corresponding to the sources and destination of each received μop and determines whether any of the architectural registers need merging. In one embodiment, each μop may have up to 3 sources and 1 destination, so that there may be up to 16 merges per cycle, 4 for each of the four received μops. The merge detector 502 develops a merge identifier (MID) and provides the MID to merge take module 504 and a merge instruction generator 506. The MID identifies each architectural register that needs to be merged for the up to 4 received μops.

The merge instruction generator 506 receives the MID, reads the information in the rename table 116 to identify the architectural registers needing merging, and generates a corresponding merge instruction for each architectural register to be merged. As previously described, the merge instruction MRG identifies the corresponding physical registers mapped to the architectural register and merges the information into the physical register storing the larger value (e.g., μopM merging PR1 and PR2 into PR1 mapped to the architectural register EAX). The merge instruction generator 506 outputs one or more merge instructions (MI) to the instruction reorder module 508.

The merge take module 504 receives the MID and determines the number of merge μops that should be inserted before each original μop received from the instruction translator 104. The merge take module 504 then splits the original μops according to one of multiple take rules and outputs a kill indication (KI) to the instruction reorder module 508 to identify which of the original instructions should be issued from the RAT 106 to the RS 108 in each clock cycle. The term "kill" means termination relative to the current clock cycle to identify the next instruction to be pushed into the next clock cycle. In one embodiment, the RAT 106 issues up to 4 μops at a time to the RS 108 including the merge μops. As described further herein, multiple take rules may be defined providing different trade-offs between timing and performance. The merge take module 504 may switch between the different take rules to ensure proper timing and/or to achieve a certain level of performance.

The instruction reorder module 508 receives the original and merge instructions OI and MI along with the KI and provides an issue instruction control that determines which of the original and merge µops are issued for each clock cycle.

Figure 6:
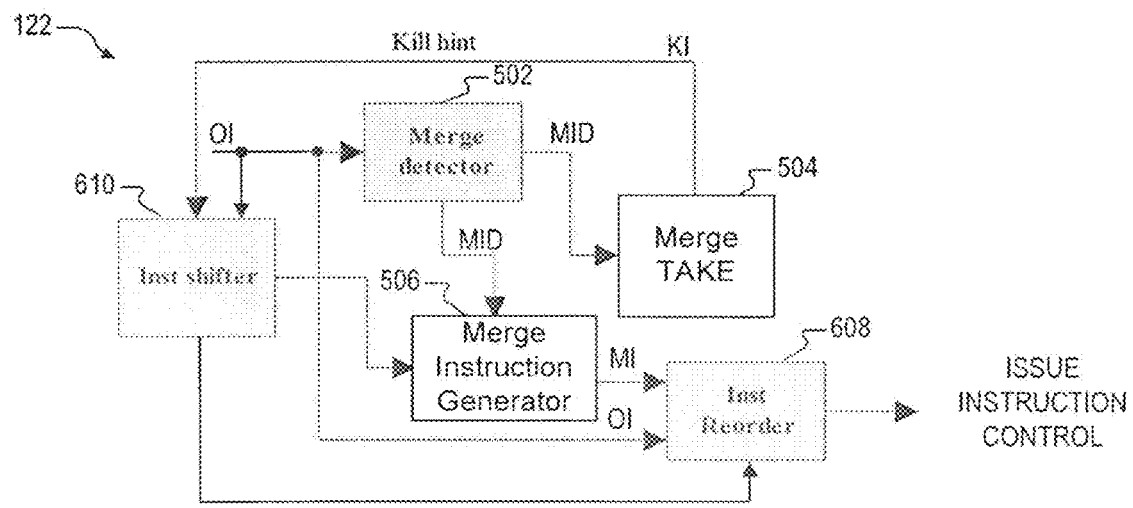
FIG. 6 is a block diagram illustrating the merge system of FIG. 1 implemented according to another embodiment of the present invention.

FIG. 6 is a block diagram illustrating the merge system 122 implemented according to another embodiment of the present invention. The original instructions (OI) provided by the instruction translator 104 to the RAT 106 are provided to the merge detector 502 and to an instruction reorder module 608, which operates in a similar manner as the instruction reorder module 508. The merge detector 502 operates in substantially the same manner to provide the MID to the merge take module 504, which develops the KI in similar manner. The KI, however, is provided instead to an instruction shifter 610, which also receives the original instructions OI. The instruction shifter 610 shifts the original µops according to the KI to determine which µop is shifted to slot 0 for each clock cycle. The merge instruction generator 506 operates in similar manner by receiving the MID and providing the merge instructions MI to the instruction reorder module 608. The instruction shifter 610 cooperates with the merge instruction generator 506 and the instruction reorder module 608 to provide the issue instruction control that determines which of the original and merge µtops are issued for each clock cycle.

Figure 7:
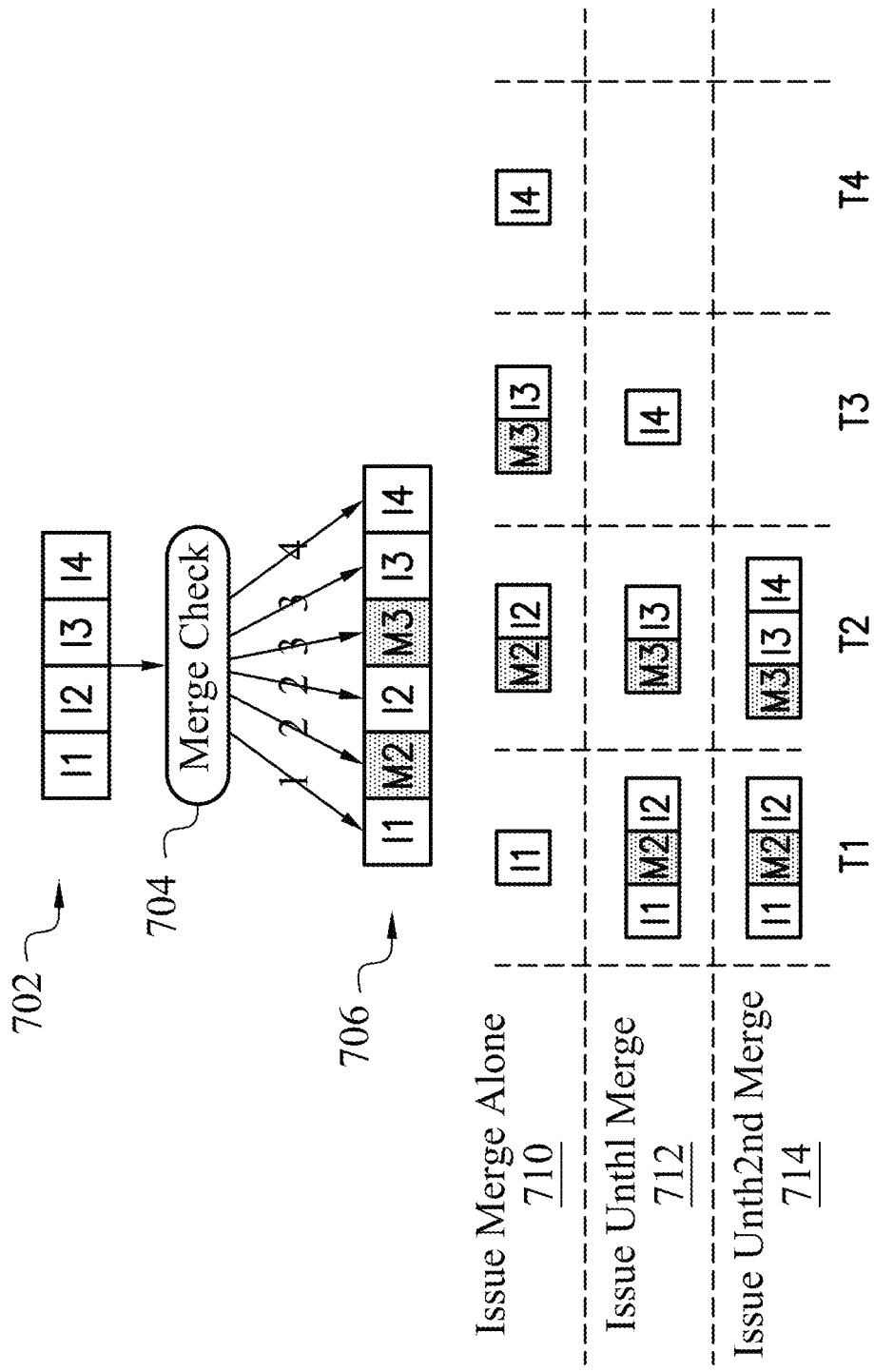
FIG. 7 is a figurative diagram illustrating exemplary take rules according to an embodiment of the present invention.

FIG. 7 is a figurative diagram illustrating exemplary take rules according to an embodiment of the present invention. A set of 4 µop instructions 702, shown as I1, I2, I3 and I4, are provided in program order by the instruction translator 104 to the RAT 106. The merge system 122 performs a merge check on the instructions I1-I4 and generates merge instructions M2 and M3. The merge system 122 inserts the merge instructions M2 and M3 into the original set of instructions 702 to provide a modified set of instructions 706. In this case, M2, which is corresponds to I2, is inserted before I2 and M3, which is corresponds to I3, is inserted before I3, so that the instruction stream is changed to I1, M2, I2, M3, I3, and I4. The merge system 122 further uses a selected one of one or more take rules to determine which of the instructions are issued for each clock cycle. The take rules do not change the ordering of the instruction stream 706, but instead determine which instructions are issued in the current cycle and which are pushed to the next cycle.

Four consecutive clock cycles T1, T2, T3 and T4 are shown for each of three different take rules. A first line shows a first take rule referred to as "ISSUE MERGE ALONE" 710, a second line shows a second take rule referred to as "ISSUE UNTIL MERGE" 712, and a third line shows a third take rule referred to as "ISSUE UNTIL $2^{ND}$ MERGE" 714. As previously described, the merge take module 504 applies an active one of the merge take rules based on the MID provided by the merge detector 502 to provide the KI used to identify the instructions that are issued in each clock cycle. The different take rules provide a trade-off between timing and performance and can be switched based on operative parameters. In each clock cycle, of course, the instruction translator 104 may continue to provide up to another 4 additional instructions (not shown). The timing takes into account functions performed by the merge detector 502 to analyze the incoming instructions to provide the MID, and functions performed by the merge instruction generator 506 to generate the desired merge instructions to be inserted into the instruction stream.

The ISSUE MERGE ALONE 710 determines that the original instructions that need merging are to be issued alone in each cycle, along with their corresponding merge instructions. Instruction I1 does not need merging and is first assigned to cycle T1. Since instruction I2 needs merging, it is pushed to the second cycle T2 along with its merge instruction M2, so that instructions M2 and I2 are issued alone in cycle T2. Then since instruction I3 needs merging, it is pushed to the third cycle along with its merge instruction M3, so that instructions M3 and I3 are issued alone in cycle T3. Instruction I4, which does not need merging, is issued in the fourth cycle T4. Although not shown, up to 3 additional instructions may be issued after instruction I4 in cycle T4 depending upon whether merging is needed. In this case, it takes 4 clock cycles to issue the instruction stream 706 for the ISSUE MERGE ALONE 710.

The ISSUE UNTIL MERGE 712 issues instructions up to the total number allowed in each cycle (like 4) and issues instructions until an instruction and all of its corresponding merge instructions have been issued in the cycle. In this case, since instruction I1 does not need merging but instruction I2 does and only needs one merge instruction M2, instructions I1, M2 and I2 are issued in the first cycle T1. The very next instruction I3 also needs merging, so instructions M3 and I3 are issued in the next cycle T2. Although not shown, it is noted that if I3 has more merge instructions besides M3, they could also be issued within T2 if the total number issued in T2 doesn't exceed the maximum number (like 4). This leaves instruction I4 to be issued in the third cycle T3. Again, up to 3 additional instructions (not shown) may be issued with instruction I4 in cycle T3 depending upon whether merging is needed and if timing can be met. In this case, it takes 3 clock cycles to issue the instruction stream 706, in which the ISSUE UNTIL MERGE 712 issues the instruction stream 706 in one less clock cycle as the ISSUE MERGE ALONE 710 thereby increasing performance.

The ISSUE UNTIL $2^{ND}$ MERGE 714 issues instructions up to the total number allowed in each cycle (like 4) and issues instructions until an instruction, all of its corresponding merge instructions and all other instructions before a next merge instruction corresponding to a next instruction have been issued in the cycle. However, instructions M3 and I3 cannot be issued together with M2 and I2 in the first cycle T1 since only a maximum of 4 instructions are allowed per cycle in the illustrated configuration. In this manner, instructions M3 and I3 are pushed to the next cycle T2. Since instruction I4 does not need merging, it may also be included in cycle T2. Although not shown, it is noted that one additional instruction may be issued in cycle T2 if the additional instruction doesn't need merging and if timing permits, like the total number issued in T2 doesn't exceed the maximum number 4. Thus, the ISSUE UNTIL $2^{ND}$ MERGE 714 provides even greater performance than the other take rules by issuing the instruction stream 706 in only two cycles, but may present additional timing challenges.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the blocks described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A processor, comprising:
a physical register file comprising a plurality of physical registers;
mapping logic that maps up to a first maximum number of said plurality of physical registers for each of a plurality of architectural registers specified in a plurality of program instructions and that stores corresponding mappings in a rename table; and
a merge system that generates only a single merge instruction for each of said plurality of architectural registers that is mapped to by multiple physical registers in which partial results are stored and thus needs to be merged, the merge system also inserts a plurality of merge instructions into said plurality of program instructions to provide a modified set of instructions, wherein the merge system determines which of said plurality of merge instructions should be inserted before any of said plurality of program instructions, and that issues said modified set of instructions in consecutive issue cycles based on a take rule.

2. The processor of claim 1, wherein said merge system comprises: a merge detector that detects whether a read instruction of said plurality of program instructions reads an architectural register mapped to multiple physical registers, that detects whether a write instruction of said plurality of program instructions would cause a mapping to exceed said first maximum number, and that generates a merge identifier identifying merging of any of said plurality of architectural registers;
a merge instruction generator that generates said merge instruction for each architectural register to be merged based on said merge identifier;
merge take logic that determines which of said plurality of merge instructions should be inserted before any of said plurality of program instructions based on said take rule and that generates a kill indication indicating which instructions are to be issued per clock cycle; and
instruction issue logic that provides an issue instruction control based on said kill indication.

3. The processor of claim 2, wherein said instruction issue logic comprises an instruction reorder module that receives said kill indication, said plurality of program instructions, and any merge instructions generated by said merge instruction generator, and that provides said issue instruction control to control instructions to be issued in each clock cycle.

4. The processor of claim 2, wherein said instruction issue logic comprises an instruction shifter and an instruction reorder module, wherein said instruction shifter shifts said plurality of program instructions according to said kill indication, and wherein said instruction reorder module receives said plurality of program instructions and any merge instructions generated by said merge instruction generator and provides said issue instruction control to control instructions to be issued in each clock cycle.

5. The processor of claim 1, wherein said take rule comprises an issue merge alone take rule that allows only one instruction that has at least one architectural register to be merged and corresponding at least one generated merge instruction to be issued in a clock cycle.

6. The processor of claim 1, wherein said take rule comprises an issue until merge take rule that allows up to a second maximum number of instructions to be issued in a clock cycle and allows issuing until an instruction that has at least one architectural register to be merged and corresponding at least one merge instruction have been issued in said clock cycle.

7. The processor of claim 1, wherein said take rule comprises an issue until second merge take rule that allows up to a second maximum number of instructions to be issued in a clock cycle and allows issuing until an instruction that has at least one architectural register to be merged, corresponding at least one merge instruction and other instructions before a next merge instruction corresponding to a next instruction have been issued in said clock cycle.

8. The processor of claim 1, wherein said take rule comprises a selected take rule from among a plurality of take rules in which each of said plurality of take rules provides a different trade-off between timing and performance.

9. The processor of claim 1, wherein said first maximum number is two.

10. A method of merging partial write results for resolving renaming size issues for a processor, comprising:
mapping each of a plurality of architectural registers specified in a plurality of program instructions in a rename table into up to a first maximum number of a plurality of physical registers;
detecting when any of said plurality of architectural registers needs to be merged before execution of at least one of the plurality of program instructions;
generating only a single merge instruction for each of said plurality of architectural registers that is mapped to by multiple physical registers in which partial results are stored and thus needs to be merged;
inserting a plurality of merge instructions into the plurality of program instructions to provide a modified set of instructions, wherein which of said plurality of merge instructions should be inserted before any of said plurality of program instructions is determined; and
issuing the modified set of instructions in consecutive clock cycles based on a take rule.

11. The method of claim 10, wherein: said detecting comprises detecting whether a read instruction of the plurality of program instructions reads an architectural register mapped to multiple physical registers; and wherein said generating comprises generating a corresponding read merge instruction.

12. The method of claim 10, wherein: said detecting comprises detecting whether a write instruction of the plurality of program instructions would cause a mapping to exceed the first maximum number; and wherein said generating comprises generating a corresponding write merge instruction.

13. The method of claim 10, further comprising generating a merge identifier that identifies any of the plurality of architectural registers that needs to be merged based on said detecting, and using said merge identifier during said generating and said issuing.

14. The method of claim 10, further comprising determining which of any generated merge instruction should be inserted before any of the plurality of program instructions based on the take rule, generating a kill indication indicating which instructions are to be issued per clock cycle, and providing an issue instruction control based on said kill indication.

15. The method of claim 10, further comprising selecting a take rule from among a plurality of take rules in which each of the plurality of take rules provides a different trade-off between timing and performance.

16. The method of claim 10, further comprising allowing only one instruction that has at least one architectural register to be merged and corresponding at least one merge instruction to be issued in a clock cycle.

17. The method of claim 10, further comprising allowing up to a second maximum number of instructions to be issued in a clock cycle and allows issuing until an instruction that has at least one architectural register to be merged and corresponding at least one merge instruction have been issued in said clock cycle.

18. The method of claim 10, further comprising allowing up to a second maximum number of instructions to be issued in a clock cycle and allows issuing until an instruction that has at least one architectural register to be merged, corresponding at least one merge instruction, and other instructions before a next merge instruction corresponding to a next instruction have been issued in said clock cycle.

19. The method of claim 10, wherein said mapping comprises mapping each of the plurality of architectural registers specified in the plurality of program instructions with up to two physical registers for each architectural register.

20. A processor, comprising:
a physical register file comprising a plurality of physical registers;
mapping logic that maps up to a first maximum number of said plurality of physical registers for each of a plurality of architectural registers specified in a plurality of program instructions and that stores corresponding mappings in a rename table; and
a merge system that generates only a single merge instruction for each of said plurality of architectural registers that is mapped to by multiple physical registers in which partial results are stored and thus needs to be merged, the merge system also inserts a plurality of merge instructions into said plurality of program instructions to provide a modified set of instructions, wherein the plurality of merge instructions are generated for said plurality of program instructions, and that issues said modified set of instructions in consecutive issue cycles based on a take rule.

* * * * *